United States Patent [19]

Morales Guerrero et al.

[11] 4,021,262

[45] May 3, 1977

[54] COMPOSITION OF MATTER FOR THE COATING OF PLANT PRODUCTS FOR THEIR PRESERVATION AND PROCESS OF MAKING SAME

[75] Inventors: Josefina C. Morales Guerrero, Mexico, D.F.; Juan Manuel Lomelin Gallardo, Tlalpan, D.F., both of Mexico

[73] Assignee: Instituto Mexicano de Investicaciones Tecnologicas, A.C., Mexico City, Mexico

[22] Filed: Jan. 15, 1975

[21] Appl. No.: 541,083

Related U.S. Application Data

[63] Continuation-in-part of Ser. Nos. 375,387, July 2, 1973, abandoned, and Ser. No. 375,386, July 2, 1973, abandoned.

[52] U.S. Cl. .................................. 106/271; 427/4
[51] Int. Cl.² .................. C08L 91/06; C09D 3/387
[58] Field of Search ................ 106/271, 10; 427/4

[56] References Cited

UNITED STATES PATENTS

| | | | |
|---|---|---|---|
| 2,214,263 | 9/1940 | Weihe | 106/10 |
| 2,993,800 | 7/1961 | Pickell | 106/271 |
| 3,323,925 | 6/1967 | Kesslin | 106/271 |

FOREIGN PATENTS OR APPLICATIONS

| | | | |
|---|---|---|---|
| 664,427 | 1/1952 | United Kingdom | 106/271 |

OTHER PUBLICATIONS

Chemistry & Technology of Waxes – Warth, pp. 736–741.

*Primary Examiner*—Theodore Morris
*Attorney, Agent, or Firm*—Fitch, Even, Tabin & Luedeka

[57] ABSTRACT

A coating which breathes and limits transmission of moisture and which is particularly adapted for coating plant products such as citrus fruits, avocadoes, mangos, and peppers. The coating comprises Candelilla wax in an aqueous dispersion, an unstable soap, xylene, and/or toluene, or their equivalent. The aqueous coating is made by a particular process to provide a coating on the plant product of desired characteristics, the process providing an oil in water emulsion with particles having a size between 0.1 microns and 0.1 millimicrons.

4 Claims, No Drawings

COMPOSITION OF MATTER FOR THE COATING OF PLANT PRODUCTS FOR THEIR PRESERVATION AND PROCESS OF MAKING SAME

This application is a continuation-in-part of an application entitled Composition of Matter for the Coating of Plant Products for their Preservation, Ser. No. 375,387, filed July 2, 1973; now abandoned and also of an application entitled Procedure for the Preservation of Fruit, Ser. No. 375,386, filed July 2, 1973.

The present invention relates to the provision of a coating which permits breathing but which limits moisture transmission, and more particularly, the invention relates to an aqueous liquid including Candelilla wax for providing a coating on fruits and vegetables which permits breathing through the coating but which, at the same time, limits transmission of moisture through the coating. The invention further relates to a process for making the aqueous liquid including Candelilla wax to provide the desired coating.

Various plant products, such as citrus fruits, rapidly deteriorate and are therefore difficult to preserve for periods of time sufficient to permit collection, shipment, and marketing. The problem, of course, is aggravated when storage periods are necessary. Thus, the handling of citrus fruits and plant products having a large pit such as peaches, avocados, plums, and mangos, as well as other fruits having small seeds, are difficult to preserve for extended periods of time.

It is known to coat fruits, vegetables, and other plant products with a coating and various wax containing materials are presently provided in the market. For example, FMC Corporation of Lakeland, Florida, provides a coating material sold under the trademark FLAVORSEAL for the coating of oranges, and also provides another product sold under the trademark STAFRESH, which is particularly adapted for coating apples. Penwalt Corporation of Oak Brook, Illinois, also provides a solution under the trademark DECCO for coating fruits. S. C. Johnson and Son, Inc., of Racine, Wisconsin provides various solutions and emulsions for coating fruit products under the trademark PERMAFRESH. Further, Makhteshim Chemical Company of Ber-Sheva, Israel sells a coating material for fruits under the trademark TAG.

The desirability of coating fruit with a wax in a solution or in an emulsion, or otherwise, is well known and disclosed in prior patents. For example, the wax coating of oranges, tangerines and other fruits with Carnauba wax, Ouricury wax and paraffin wax with small amounts of Carnauba wax or Candelilla wax is set forth in U.S. Pat. No. 2,510,816. U.S. Pat. No. 2,383,451 discloses the use of Ouricury in combination with a fatty acid and an alkaline agent to provide an aqueous wax emulsion for the coating of fruit.

However, the solutions and emulsions of the prior art have not provided the most desired liquids for the coating of fruits, vegetables and other products to provide the desired breathing and limited moisture transmission for longer preservation of the products. Further, the teachings of the prior art have not disclosed how to effectively use Candelilla wax.

It is known to incorporate fungicides and bactericides in coatings to provide improved protection against deterioration. This is shown, by way of example, in U.S. Pat. No. 3,181,468, and the above mentioned available commercial products include such agents as sodium orthophenylphenol, and diphenyl.

Candelilla wax is a known wax and is available in substantial quantities in Mexico. The Candelilla wax, has been difficult to disperse in an aqueous solution in significant quantities so that it could provide an effective coating for fruit and vegetable products, although it has been used for chewing gum and is known to be food safe.

A principal object of this invention is the provision of an improved aqueous liquid for providing a coating which permits breathing but which limits moisture transmission. A further object of the invention is to provide such an improved coating which permits better preservation of fruits and vegetables. Another object of the invention is the provision of an aqueous liquid including Candelilla wax in sufficient amounts to provide a coating which breathes and which limits moisture transmission to provide a more effective coating for fruits, vegetables and other products. A still further object of this invention is the provision of a process of effectively incorporating Candelilla wax in an aqueous liquid.

Still further objects and advantages of the invention will become apparent by reference to the following description.

The coating of the invention is first prepared in aqueous form at a solids level of less than 30 percent. Upon application of the aqueous coating, the moisture evaporates to provide a coating with desired breathing and control of moisture transmission.

The coating of the invention comprises 20 to 60 parts of Candelilla wax; 5 to 10 parts of an unstable soap; and more than 0.5 parts of xylene and/or toluene, or their equivalents. The coating is transparent and the wax particles will have particle size of less than 0.1 microns and larger than 0.1 millimicrons, with the coating being within this range. The aqeuous coating will have the consistency of water or a light syrup and at a 20 percent solids level, by way of example, will have a viscosity of about 20 cps at 20° C. and a surface tension of about 34 dynes per square centimeter. The wax in the aqueous phase is in the form of an oil in water emulsion.

The coating of the invention is particularly directed to the use of Candelilla wax which has the following composition:

TABLE I

| Composition | Percent |
| --- | --- |
| Hydrocarbons | 50–51 |
| Esters of wax acids and alcohols | 28–29 |
| Free alcohols, sterols and neutral resins | 12–14 |
| Free acids | 7–9 |
| Moisture and mineral matter | 0.7 |

The Candelilla wax has the following physical properties:

TABLE II

| Constants | |
| --- | --- |
| Specific gravity at 15° C.–25° C. | 0.9820–0.9856 |
| Melting point (° C.) | 67–72 |
| Setting point (° C.) | 63–68 |
| Acid value | 12.7–18.1 |
| Saponification number | 35–60 |
| Refractive Index at 85° C. | 1.4545–1.4626 |
| Non saponifiables (%) | 67.5–76.7 |
| Iodine number | 12–22 |
| Ash (%) | 0.3–0.7 |

TABLE II-continued

| Constants | |
|---|---|
| Moisture (%) | 0.52–1.5 |

Candelilla wax is prepared from a plant product known as *Euphorbia cerifera*, by refining through heating with sulfuric acid at 100° C. for about one hour. The wax is skimmed off as a foam and reboiled to remove the water and provide the crude wax which is known as Cerote. The Candelilla wax is to be distinguished from Ouricury wax, Carandy wax, and Carnauba wax which are distinguishable from the Candelilla wax by the character and nature of their respective compositions. The Candelilla wax is most desired for providing the coating properties of this invention. (See C. Warth, A., *The Chemistry and Technology of Waxes* 1956.)

The unstable soap for use in the coating is prepared in situ although the soap may be separately formed and added in the preparation of the aqueous coating. The soap is preferably prepared from morpholine or triethanolamine, although the unstable soap may also be prepared from ammonia and piperidine. These latter compounds tend to provide unsatisfactory flavor and/or aroma. These compounds saponify with free fatty acids having a carbon chain length of from about $C_{12}$ to $C_{22}$ and the fatty acids may be either saturated or unsaturated fatty acids, such as stearic acid and oleic acid.

The xylene or toluene, or equivalent compounds, are present at a level sufficient to provide a clear coating and in this connection will be present at a level of above 0.5 parts with the wax and unstable soap. The xylene and toluene are necessary to aid in the formation of the colloidal dispersion (emulsions) and to provide wax particles sizes under 0.1 microns so as to achieve the desired thinness of films. Further, the xylene and toluene both have bacteriostatic properties. However, the xylene is the preferred ingredient in the coating, as distinguished from toluene, since toluene has somewhat lower boiling point than xylene when present in water.

There is no specific upper limit for the amount of xylene or toluene but cost considerations and other factors will normally limit the amount of xylene to less than 1.0 parts with the wax and unstable soap.

The coating composition may include various compounds which functions as fungicides or bactericides and which are well known. Examples of these agents are: sodium orthophenylphenate, benomyl, thiabendazole, 2-aminobutane and diphenyl, for the preservation especially of citrus fruits and such as butylamines, quinosol, 2.6-dichloro 4-nitroaniline, pentachloronitrobenzene, 8-hydroxyquinolein, debromotetrachloroethane, tetraiodoethylene and potassium pyrosulphite. The agents are present at levels sufficient to achieve the desired results.

The emulsion may be mixed with an emulsifiable polyethylene by replacing 8 to 33 percent of the Candelilla wax with such polyethylene. This may be desirable under certain conditions to lower the cost of the coating.

The aqueous coating may desirably include a compound which serves to plasticize the wax such as polyethylene glycol and propylene glycol. Some advantage is obtained when the coated product has deformities or shrinks.

The coating can also include essential oil such as citral and lemonene which can provide aroma, fungicidal and bactericidal properties.

The manner of preparation of the coating is an important feature and is necessary to provide the desired aqeuous coating. In this connection, the aqueous coating is prepared by first melting the Candelilla wax and this is achieved at a temperature of above about 70° C. After melting, the fungicidal and/or bactericidal agent may be added, if desired at an effective amount. The fatty acid is then added and mixed with the wax. The xylene, toluene or their equivalent are next added and the temperature of the blend is then raised to about 90° C. The saponifying agent is added and after the saponification occurs, water is added gradually, and a water in oil emulsion is formed. Upon continued addition of the water, the phase inverts when the mixture comprises about 70% water and 30% solids resulting in an oil in water emulsion. Water may continue to be added to provide lower solids content, but, in general, the solids content will be for coating purposes in the range of 10% to 20%. The oil in water emulsion is rapidly cooled to about 25° C. and this is accomplished in about thirty (30) minutes. The mixture is maintained under high agitation during cooling. After cooling, the emulsion is to be maintained at temperature such that its properties are not lost. The emulsion may be mixed with water to varying concentrations of solids.

A portion of wax may be replaced, as above indicated, with emulsifiable polyethylene. In the process, plasticizers may be added prior to phase inversion.

The aqueous coating may be sprayed on the product to be coated or the product may be dipped in the aqueous coating. Commercial equipment is available for either spraying or dipping the product. The thickness of the coating will vary with the solids content of the aqueous coating and with the conditions of cooling.

The resulting coating provides highly desirable breathing while limiting moisture transmission. The coating is excellent for preservation of plant products and is an improvement over available coating materials presently being marketed. An attractive coated product is provided with natural glow and the coating has good adherence to plant products. The preservation provided by the coating reduces refrigeration requirements and avoids the need for individual wrapping of plant products. Further, the inclusion of various agents protects the plant product from the growth of fungi, molds and bacteria.

The invention will be illustrated with the following examples:

EXAMPLE I

One lot of Mexican green lemons, quality-selected, was washed with running water, dried and coated by immersion in a clear aqueous coating having the following composition: Candelilla wax, 40 parts; oleic acid, 12 parts; morpholine, 9 parts; xylene, 0.5 parts; ethyleneglycol, 1.0; sodium orthophenylphenate 2 parts; and water 220 parts. After coating, the fruits were stored at 10° C. and 20° C., respectively. For comparison purposes, the same process prior to immersion used for sub-lots of lemons used as control.*

Weekly readings were taken of the weight loss and maximum shelf life of each lot.** Results are summarized in Tables 3 and 4.

TABLE 3

PERCENTAGE OF WEIGHT LOSS IN MEXICAN GREEN LEMON

| | \<- WEEKS -\> | | | | | | | |
|---|---|---|---|---|---|---|---|---|
| | 1 | 2 | 3 | 4 | 5 | 6 | 7 | 8 |
| Storage to 20° C. | | | | | | | | |
| Control | 17 | 20 | 21 | 23 | 25 | 27.5 | 29 | 32 |
| Aqueous Coating | 2 | 3 | 4.5 | 6 | 7 | 9 | 12 | 15 |
| Storage to 10° C. | | | | | | | | |
| Control | 6 | 8 | 10 | 12 | 14 | 16 | 18 | 20 |
| Aqueous Coating | 0.3 | 0.3 | 0.3 | 1 | 1.6 | 1.8 | 3 | 3.8 |

*Non-coated lemons stored for same time and at same temperature.
**Shelf life was counted to the day when the first fruit in each lot lost its physical, organoleptic properties and/or spoilage started.

TABLE 4

**STORAGE LIFE\* OF MEXICAN GREEN LEMON**

Storage at 20° C.

| | |
|---|---|
| Control | 1 week |
| Aqueous Coating | 10 weeks |

Storage to 10° C.

| | |
|---|---|
| Control | 7 weeks |
| Aqueous Coating | 20 weeks |

*The storage life was taken until the first fruit lost their physical and organoleptics characteristics.

EXAMPLE II

In this example, green tomatoes and a lot of ripe tomatoes were used. Tomatoes were selected and classified by size, washed with running cold water, dried at ambient temperature and coated by immersion in the clear aqueous coating comprising Candelilla wax 40 parts; oleic acid, 12 parts; morpholine, 9 parts; dimethylamine propanol, .5 parts; xylene, 0.5 parts; ethylene glycol 1.5 parts, sodium orthophenylphenate 2.0 parts; and water 220 parts. The excess coating was removed and the coating was dried under an air jet at temperature of between 25° C. and 28°C. Upon drying, the tomato sub-lots were stored at 12° C. and 20° C., respectively. Typical weight loss; results are summarized in Tables 5 and 6.

TABLE 5

PERCENTAGE OF WEIGHT LOSS IN TOMATOES

| | WEEKS | | |
|---|---|---|---|
| | 1 | 2 | 3 |
| Storage to 20° C. | | | |
| Control | 6 | 13 | 20 |
| Aqueous Coating | 1 | 5 | 9.5 |
| Storage to 12° C. | | | |
| Control | 2 | 4 | 5 |
| Aqueous Coating | 0.5 | 2.5 | 3 |

TABLE 6

PERCENTAGE OF WEIGHT LOSS IN GREEN TOMATOES

| | WEEKS | | | |
|---|---|---|---|---|
| | 1 | 2 | 3 | 4 |
| Storage to 20° C. | | | | |
| Control | 1 | 6 | 11.5 | 18 |
| Aqueous Coating | 0 | 5 | 7 | 13 |
| Storage to 12° C. | | | | |

TABLE 6-continued

PERCENTAGE OF WEIGHT LOSS IN GREEN TOMATOES

| | WEEKS | | | |
|---|---|---|---|---|
| | 1 | 2 | 3 | 4 |
| Control | 3.5 | 5 | 8 | 13.5 |
| Aqueous Coating | 0 | 1 | 3.5 | 8 |

The period of shelf life of tomato sub-lots stored at 12° C. and 20° C., was doubled with application of the aqeuous coating as compared with the shelf life of lots used as controls.*

* Non-treated tomatoes stored for the same time and at the same temperature.

EXAMPLE III

A lot of mangos, Manila veriety, in mid-ripening stage, were carefully selected and washed, dried at ambient temperature and coated with a clear aqueous coating comprising Candelilla wax, 40 parts; 10 parts of emulsifiable polyethylene; 12 parts of oleic acid; 9 parts of morpholine; 0.5 parts of xylene, 3 parts of sodium orthophenylphenate; and 220 parts of water. The excess coating was removed with a small brush and fruits were dried with an air jet at a temperature not exceeding 26° C. Immediately afterwards, all sub-lots were stored at 10° C. and 20° C., respectively. Other sub-lots of mangos were similarly processed to the step prior to coating; these lots were used as controls.

Weekly records of weight loss, percentage of damaged fruit were taken and organoleptic tests were carried out. Results are shown in Tables 7 and 8:

TABLE 7

PERCENTAGE OF WEIGHT LOSS IN MANGOS

| | DAYS | | | | | | |
|---|---|---|---|---|---|---|---|
| | 1 | 2 | 3 | 6 | 7 | 8 | 9 |
| Storage to 20° C. | | | | | | | |
| Control | 1.24 | 2.37 | 3.42 | 7.0 | 8.48 | — | — |
| Aqueous Coating | 0.43 | 0.67 | 0.96 | 1.72 | 1.98 | 2.06 | 2.53 |
| Storage to 10° C. | | | | | | | |
| Control | 0.31 | 0.54 | 0.74 | 1.23 | 1.58 | 2.0 | 2.21 |
| Aqueous Coating | 0.19 | 0.16 | 0.19 | 0.22 | 0.22 | 0.60 | 0.57 |

PERCENTAGE OF WEIGHT LOSS IN MANGOS

| | DAYS | | | | | | |
|---|---|---|---|---|---|---|---|
| | 10 | 13 | 14 | 15 | 16 | 17 | 20 | 21 |
| Storage to 20° C. | | | | | | | | |
| Control | — | — | — | — | — | — | — | — |
| Aqueous Coating | 2.79 | 3.55 | 4.05 | 4.5 | — | — | — | — |
| Storage to 10° C. | | | | | | | | |
| Control | 2.68 | 5.56 | — | — | — | — | — | — |
| Aqueous Coating | 0.95 | 1.5 | 1.66 | 1.70 | 1.82 | 2.14 | 2.3 | 3.36 |

TABLE 8

**STORAGE LIFE\* OF MANGOS**

Storage to 20° C.

| | |
|---|---|
| Control | 7 days |
| Aqueus Coating | 15 days |

Storage 10° C.

| | |
|---|---|
| Control | 13 days |

TABLE 8-continued

STORAGE LIFE* OF MANGOS

| | |
|---|---|
| Aqueous Coating | 21 days |

*The storage life was taken until 100% of the fruits lost their physical and organoleptic characteristics.

With regard to the percentage of mangos spoiled during storage at 20° C., it was approximately twenty percent at the end of 7 days, for the sub-lots of mangos coated with the aqueous coating and of one hundred percent for the sub-lots used as controls which were non-treated mangos stored for the same time and at the same temperature.

The sub-lots of mangos stored at 10° C. showed the same percentage of damaged fruit, that is twenty percent for the sub-lots treated with the aqueous coating and of one-hundred percent for the control sub-lots. This however, happened after 23 days of storage.

It was noted that the coated mangos had a shelf life period twice as long, both at 10° C. and 20° C. in comparison with the period for the sub-lots used as control, as shown in Table 8.

EXAMPLE IV

"Dancy" tangerines, classified as "export-quality", were selected by size, washed with cold water and the excess water was removed with a jet of warm air. Immediately afterwards, tangerines were coated with aqueous coating comprising 40 parts of Candelilla wax; 10 parts of emuslifiable polyethylene; 12 parts of oleic acid; 9 parts of morpholine; ethylene glycol 1.0 parts; xylene 0.5 parts; and 3 parts of sodium orthophenylphenate. The coating was dried with an air jet and sub-lots were stored at temperatures of 10° C. and 20° C., respectively. The same procedure, with the exception of immersion was followed with the other group of tangerines used as controls and the non-coated tangerines were stored for the same time and at the same temperature.

A weekly record was taken of the weight loss, number of damaged fruits and organoleptic tests were carried out. Some of the results are shown in Tables 9, 10 and 11.

Table 9

PERCENTAGE OF WEIGHT LOSS IN TANGERINES

| | WEEKS | | | | | |
|---|---|---|---|---|---|---|
| | 1 | 2 | 3 | 4 | 5 | 6 | 7 |

| STORAGE TO 20° C. | | | | | | | |
|---|---|---|---|---|---|---|---|
| Control | 6.5 | 12.2 | 23.5 | 30 | — | — | — |
| Aqueous Coating | 1.65 | 3.03 | 8 | 11.9 | 14.6 | 18.4 | 22 |

| | WEEKS | | | | | |
|---|---|---|---|---|---|---|
| | 1 | 2 | 3 | 4 | 5 | 6 | 7 |

| Storage to 10° C. | | | | | | | |
|---|---|---|---|---|---|---|---|
| Control | 4.8 | 7.49 | 11.5 | 16.6 | 22 | — | — |
| Aqueous Coating | 0.66 | 0.75 | 1.79 | 4.55 | 7.5 | 9.6 | 12.2 |

| | WEEKS | | | | | |
|---|---|---|---|---|---|---|
| | 8 | 9 | 10 | 11 | 12 | 13 | 14 |

| Storage to 20° C. | | | | | | | |
|---|---|---|---|---|---|---|---|
| Control | — | — | — | — | — | — | — |
| Aqueous Coating | 27 | 31.5 | 35 | 37 | 39 | — | — |

| Storage to 10° C. | | | | | | | |
|---|---|---|---|---|---|---|---|
| Control | — | — | — | — | — | — | — |
| Aqueous Coating | 14.06 | 15.8 | 17.7 | 20.8 | 22.9 | 24 | 26 |

TABLE 10

PERCENTAGE OF WASTAGE OF TANGERINES DURING STORAGE

| | WEEKS | | | | | | |
|---|---|---|---|---|---|---|---|
| | 1 | 2 | 3 | 4 | 5 | 6 | 7 |

| Storage to 20° C. | | | | | | | |
|---|---|---|---|---|---|---|---|
| Control | — | — | 30 | 100 | — | — | — |
| Aqueous Coating | — | — | 18 | 25 | 30 | 40 | 45 |

| Storage to 10° C. | | | | | | | |
|---|---|---|---|---|---|---|---|
| Control | — | — | 10 | 10 | 48 | 27 | 50 |
| Aqueous Coating | — | — | — | 10 | 10 | 10 | 27 |

| | WEEKS | | | | | |
|---|---|---|---|---|---|---|
| | 8 | 9 | 10 | 11 | 12 | 13 | 14 |

| Storage to 20° C. | | | | | | | |
|---|---|---|---|---|---|---|---|
| Control | — | — | — | — | — | — | — |
| Aqueous Coating | 55 | 55 | 55 | 70 | 100 | — | — |

| Storage to 10° C. | | | | | | | |
|---|---|---|---|---|---|---|---|
| Control | 100 | — | — | — | — | — | — |
| Aqueous Coating | 30 | 30 | 36 | 45 | 60 | 80 | 100 |

TABLE 11

STORAGE LIFE OF TANGERINES

Storage to 20° C.

| | |
|---|---|
| Control | 4 weeks |
| Aqueous Coating | 12 weeks |

Storage to 10° C.

| | |
|---|---|
| Control | 8 weeks |
| Aqueous Coating | 16 weeks |

EXAMPLE V

One lot of "Habanero" hot peppers, was coated by spraying with the clear equeous coating comprising 40 parts Candelilla wax; 12 parts oleic acid; 9 parts morpholine; 0.5 parts xylene and 2 parts sodium orthophenylphenate. The coating was dried at ambient temperature. Sub-lots together with sub-lots used as controls, were stored in warehouse where the temperatures ranged between 15° C. and 20° C.

In this experiment, it was observed that the shelf life of the coated hot pepper sub-lots was three times longer by comparison with the lots used as controls which were noncoated and stored for the same time and at the same temperature.

EXAMPLE VI

A lot of Valencia variety of oranges, classified as fruit for exportation, was washed in running water, dried and coated by immersion in an aqueous coating of the following composition; Candelilla wax, 40 parts; emulsifiable polyethylene, 10 parts; oleic acid, 12 parts; morpholine, 8 parts; xylene 6 parts; 2 parts of sodium orthophenylphenate; water 220 parts. When the fruit was covered it was stored at 10° and 20° C., respectively. For the purpose of comparison, the same procedure was followed as before the coating operation for oranges which served as control sub-lots, the control oranges being non-coated, and stored for the same time and temperature.

During the storage period at both 10° C. and 20° C. weekly, the loss in weight, the period of commercial life and the percentage of fruit spoiled in each sub-lot was recorded.

The results obtained indicated that the fruit covered with aqueous coating gave a loss of weight much less than the control sub-lot, as for example, in the third week of storage the control sub-lot showed a loss of weight on the order of 12% while the fruit covered showed 2% with the same storage time and at 20° C.

The period of commercial life for sub-lots treated with the aqueous coating will result in double that of the control sub-lot. The period of commercial life was counted to the first day on which the first fruit of each lot loses its physical, organoleptic properties and/or spoilage started. In the recording of the fruit damaged it is observed that in the fifth week the control sub-lot yields 100% of fruit damage, while this percentage is reached in the coated sub-lot after the fifteenth week. During the storage at 10° C., the results were similar, that is, in all of the controls recorded, it was observed that the sub-lots of oranges with coatings have a superior behavior in comparison with the control sub-lots.

The aqueous coatings of the foregoing Examples were each prepared in accordance with the procedure of the invention and provided clear coatings having a pH in excess of 9.0. The pH should be in excess of 7.0 and at lower pH values the dispersions break. The pH should be less than about 11.0. The aqueous coatings of the foregoing Examples at 20% solids and at 20° C. had a viscosity of about 20 cps and a surface tension of about 33 dynes per square centimeter.

While the fruits coated with the aqueous coatings are compared with uncoated fruits, tests have shown the coatings to be superior to commercially available coatings for fruits. Substantial testing has demonstrated many advantages to the use of the aqueous coating and its unique properties in preserving plant products.

The various features of the invention which are believed new are set forth in the following claims:

We claim:

1. A process for the preparation of an aqueous liquid coating comprising the steps of melting 20 to 60 parts of Candelilla wax, mixing in 5 to 10 parts of an unstable soap and more than 0.5 parts but less than 1.0 parts of toluene and/or xylene, adding water with mixing, said water being gradually added to form a water in oil emulsion, gradually adding additional water to a level in excess of 70 percent of the combined mixture to cause phase inversion and so as to form an oil in water emulsion having a wax particle size of between 0.1 microns and 0.1 millimicrons, and rapidly cooling said mixture, and unstable soap being the product of saponification of morpholine, triethanolamine, piperdine and/or ammonia with a fatty acid having a carbon chain between $C_{12}$ and $C_{22}$.

2. A process in accord with claim 1 wherein the unstable soap is prepared in situ by saponification of morpholine, triethanolamine, piperidine and/or ammonia with a fatty acid having a carbon chain between $C_{12}$ and $C_{22}$.

3. A process in accord with claim 2 wherein the saponification agent is added at a level to provide a pH in excess of 9.

4. A process in accord with claim 1 wherein cooling is effected to about 25° C. in 30 minutes.

* * * * *